J. B. COURTET.
HYDRAULIC RAM.
APPLICATION FILED NOV. 27, 1909.
1,005,417.
Patented Oct. 10, 1911.
FIG. 1
FIG. 2
FIG. 3
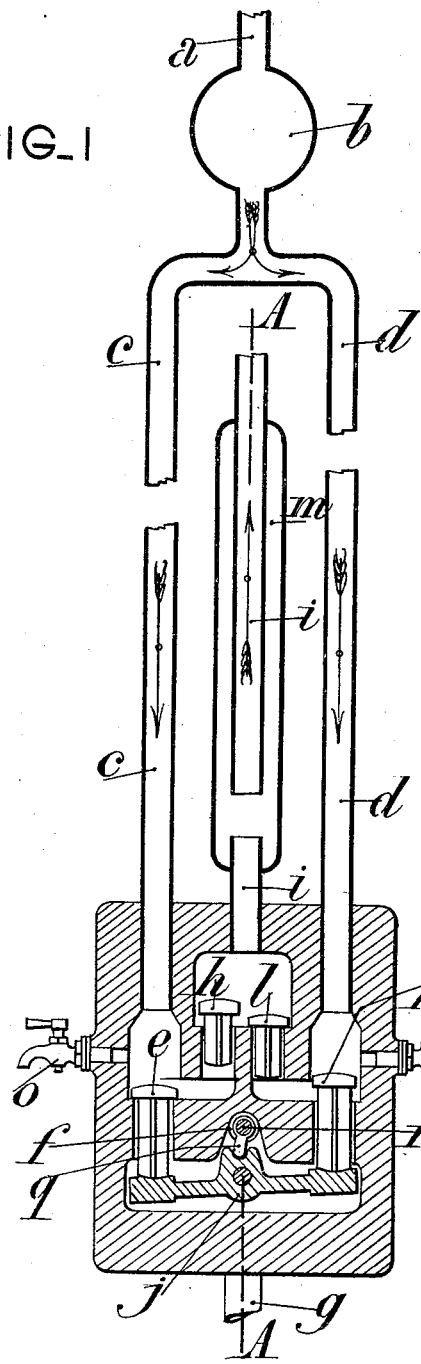
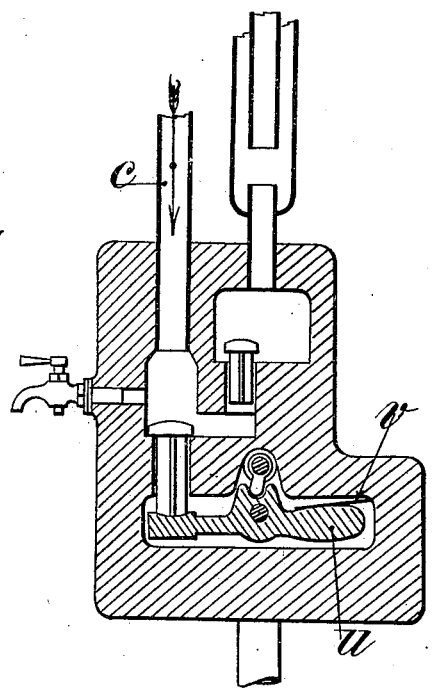
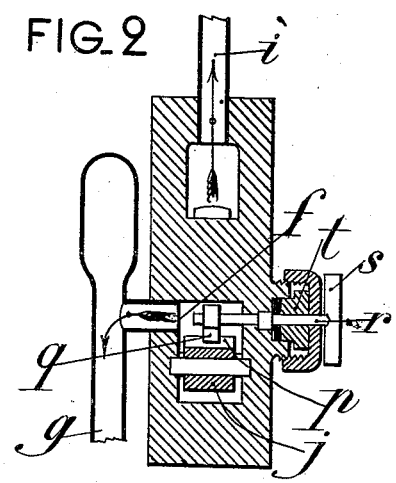
WITNESSES
W. P. Burke
A. F. Herman
INVENTOR
Jean Baptiste Courtet
By Wm Wallace White
ATTY.
COLUMBIA PLANOGRAPH CO., WASHINGTON, D. C.

UNITED STATES PATENT OFFICE.

JEAN BAPTISTE COURTET, OF ROMANS, FRANCE.

HYDRAULIC RAM.

1,005,417. Specification of Letters Patent. Patented Oct. 10, 1911.

Application filed November 27, 1909. Serial No. 530,267.

*To all whom it may concern:*

Be it known that I, JEAN BAPTISTE COURTET, a citizen of the French Republic, residing at Romans, Drôme, in France, have invented certain new and useful Improvements in Hydraulic Rams, of which the following is a specification.

The object of the present invention is an apparatus for raising liquids, particularly water to a height greater than that of the fall at disposal.

The apparatus is particularly adapted for use in domestic installations and although of very simple construction and compact it is of great stability and works with a high efficiency.

The accompanying drawing shows more or less diagrammatically apparatus according to the present invention, Figure 1 being a section of part of such apparatus, Fig. 2 a partial section on the line A—A of Fig. 1 and Fig. 3 a section of a modification.

The water entering through the pipe $a$, traverses a filter $b$ for removal of impurities and from such filter flows to the apparatus through a double conduit $c$ $d$ of a length according to the height of the fall at disposal. In the position shown in the drawing, the two conduits $c$ and $d$ being under the natural pressure of the water, the valve $e$ is closed and instantly stops the flow of water through the outlet $f$, and the pipe $g$, so that a certain quantity of water is introduced into the rising column $i$ through the valve $h$. However at the same time that the valve $e$ is closed, the beam $j$ has opened the valve $k$ and immediately the flow from the conduit $d$ taking place through said valve, the water flows away through $f$ and $g$, and in its passage carries along the valve $k$ which in turn becomes closed whereupon the valve $e$ is opened and a further quantity of water is introduced into the rising column $i$. It will be seen that the valves $e$ and $k$ are alternately opened and closed by the beam $j$, and produce at each closure a hydraulic action which lifts one or other of the valves $l$ and $h$ and forces into the rising column $i$ a certain quantity of water which will be used for example at the upper floors of a house, while the conduit $g$ will continue to supply the lower floors. In order to control or regulate the descending current of water through said conduit $g$, the end closed by the latter is formed as a chamber into which passes the air contained in the apparatus, or carried forward by the water. This air can not pass back to the apparatus. When this chamber is filled, the excess of air is carried along by the descending current. An air chamber $m$ also surrounds the rising conduit $i$ for regulating the ascending current. Two discharge cocks $o$, $o$ may also be provided, particularly for outlet of air which is contained in the apparatus before operation of same.

It is well understood that the details of construction and installation of the device may be varied according to desire. Thus, the ascending column may be divided into two conduits, and the shape of the beam could be modified, for example it may as shown in the drawing, be provided with a groove $p$, into which engages a small lever $q$ integral with the rod $r$, which again is integral with a handle $s$ adapted for actuation from the exterior for facility in operating the apparatus. It will be sufficient to slightly turn said handle to the right or left in order to move the beam. A small stuffing box $t$ will prevent leakage of water or air around the rod $r$.

In Fig. 3 a simplified apparatus is shown with only one descending conduit $c$ for supplying water. In this case one end of the beam carries a counter weight $u$ acted on by a spring $v$ and the apparatus can be placed in connection with a conduit without preparation or particular arrangement.

What I claim as my invention and desire to secure by Letters Patent of the United States is:—

Apparatus for raising liquids comprising two descending inlet conduits for the incoming liquid, a rising conduit, anti-return valves between the ends of the inlet conduits and the rising conduit, a chamber positioned below the lower terminals of said inlet conduit, there being ports extending between said conduits and said chamber, valves positioned within said ports and an outlet conduit leading from said chamber and a rocking beam positioned within said chamber and connecting said last mentioned valves, whereby when one is closed the other is opened so that the inlet conduits are alternately placed in communication with the outlet conduit through the latter valves and with the rising conduit through the anti-return valves.

In witness whereof I have signed this specification in the presence of two witnesses.

JEAN BAPTISTE COURTET.

Witnesses:
 THEODORE LOIRE,
 VICTOR GUILLE.